United States Patent [19]
Hering et al.

[11] Patent Number: 5,462,287
[45] Date of Patent: Oct. 31, 1995

[54] METHOD FOR THE MANUFACTURE OF A SHAFT SEAL

[75] Inventors: Jürgen Hering, Sievershütten; Rolf Johnen; Gerd Upper, both of Hoisdorf, Germany

[73] Assignee: Dichtungstechnik G. Bruss GmbH & Co. KG, Hoisdorf/Hamburg, Germany

[21] Appl. No.: 209,934

[22] Filed: Mar. 11, 1994

[30] Foreign Application Priority Data

Mar. 12, 1993 [EP] European Pat. Off. ............ 93104037

[51] Int. Cl.⁶ .................................................. F16J 15/32
[52] U.S. Cl. ........................... 277/37; 277/11; 277/134; 277/152
[58] Field of Search .................... 277/35, 37, 11, 277/152, 153, 134, 203, 181, 182

[56] References Cited

U.S. PATENT DOCUMENTS

| | | | |
|---|---|---|---|
| 3,275,331 | 9/1966 | Mastrobattista et al. | 277/35 |
| 4,132,421 | 1/1979 | Corsi et al. | 277/182 |
| 4,484,751 | 11/1984 | Deuring | 277/182 |
| 4,739,998 | 4/1988 | Stenslogg et al. | 277/134 |
| 5,123,661 | 6/1992 | Johnston et al. | 277/189 |
| 5,209,502 | 5/1993 | Savola | 277/35 |

FOREIGN PATENT DOCUMENTS

| | | |
|---|---|---|
| 0139503 | 5/1985 | European Pat. Off. |
| 2460185 | 7/1975 | Germany . |
| 3327229 | 2/1985 | Germany . |
| 3634735 | 4/1988 | Germany . |

*Primary Examiner*—Daniel G. DePumpo
*Attorney, Agent, or Firm*—Lawrence J. Shurupoff

[57] ABSTRACT

A seal for sealing the end of a shaft passing out of the end wall of a casing, as well as for sealing the end wall, is characterized in that a gasket receptacle is manufactured as a light metal pressure die casting, that a polytetrafluoroethylene sealing member is pressed from one side of the gasket receptacle towards which a recess is open and the radially outer portion of the shaft seal ring is injected round on either side with an elastomer material via a connecting channel of the die casting towards an end wall-side groove for receiving a static gasket during its moulding to the gasket receptacle. In the final operating stage, the sealing lip of the sealing member penetrated by a tube is bent axially by drawing onto a sleeve.

9 Claims, 3 Drawing Sheets

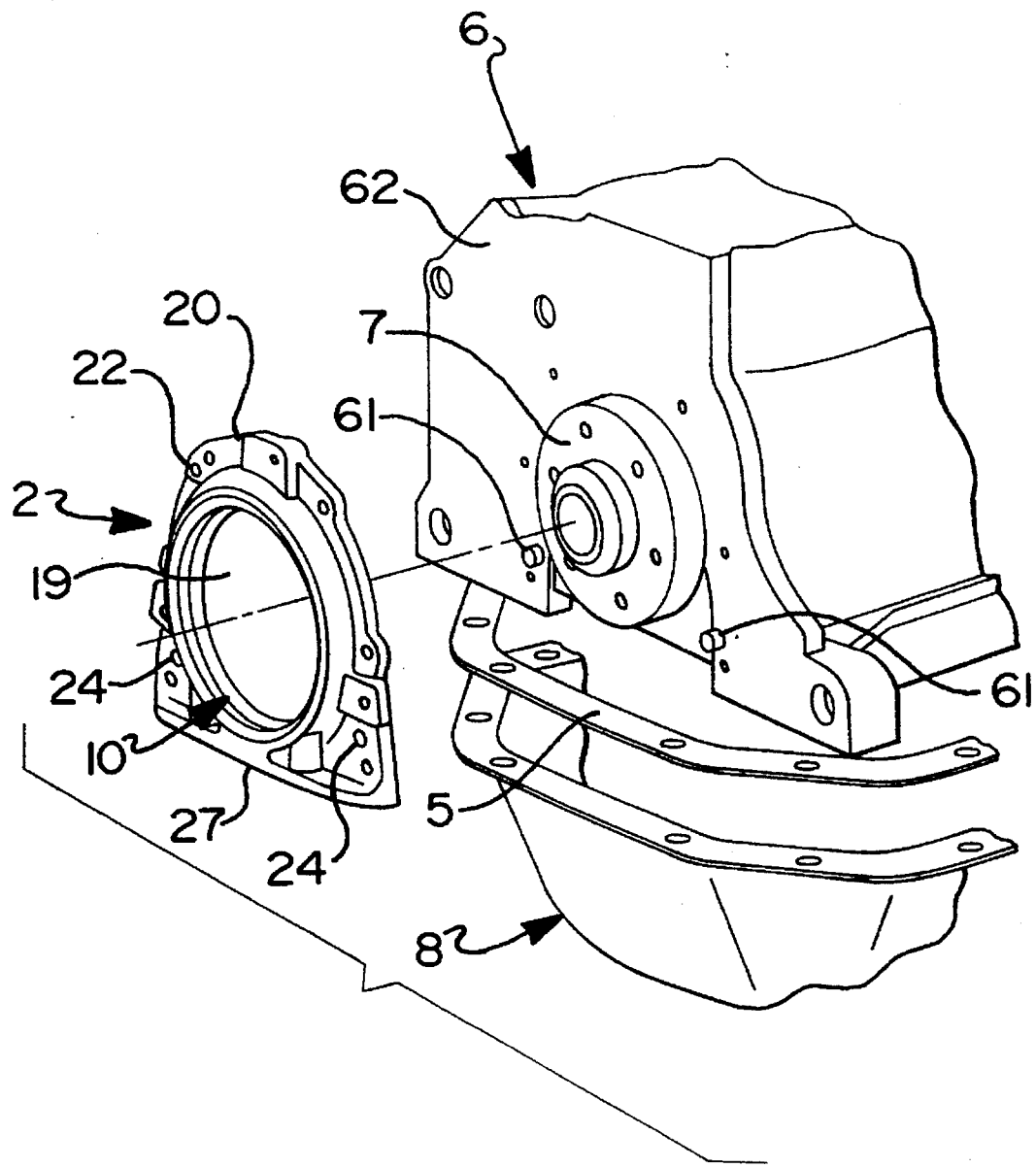

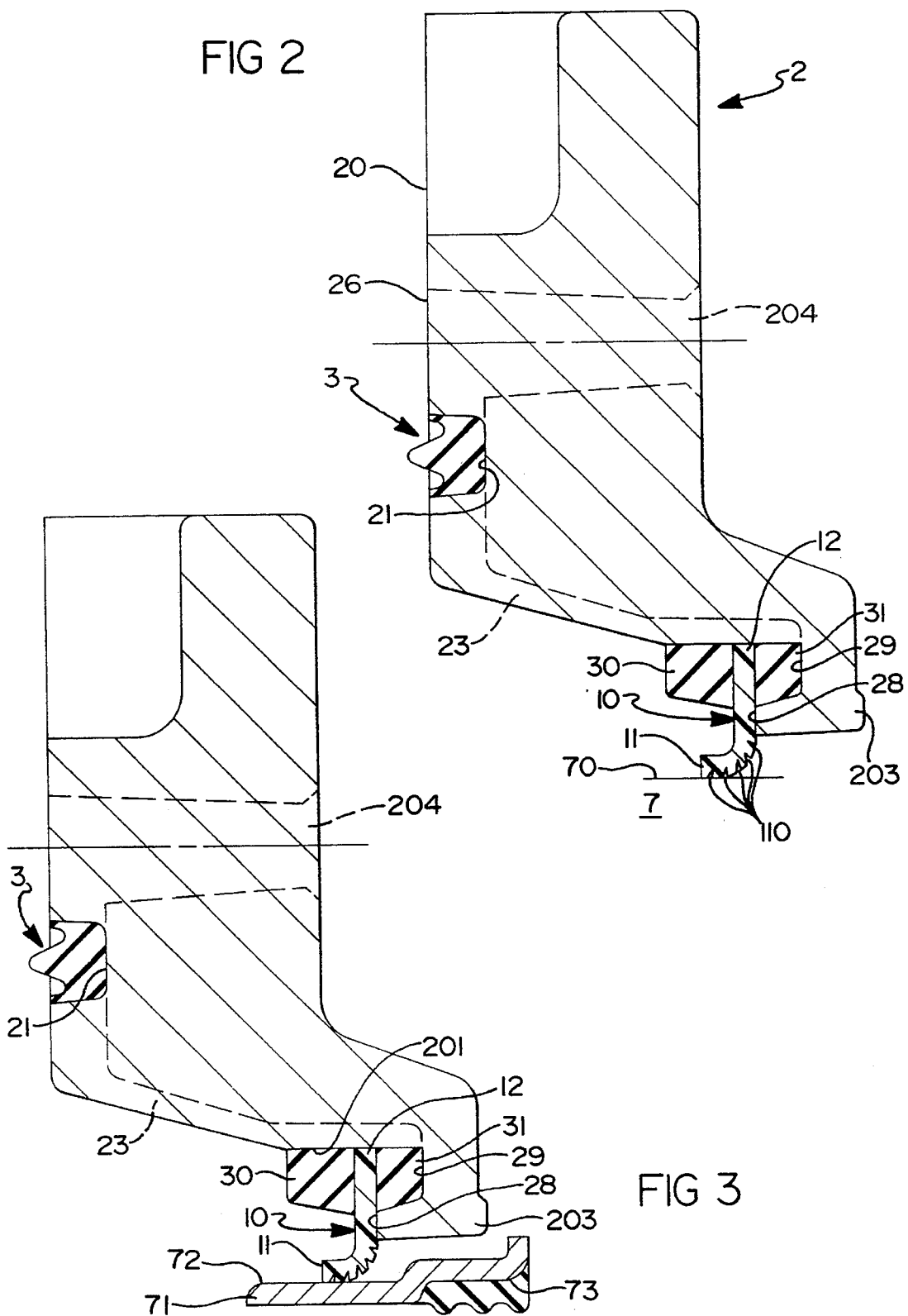

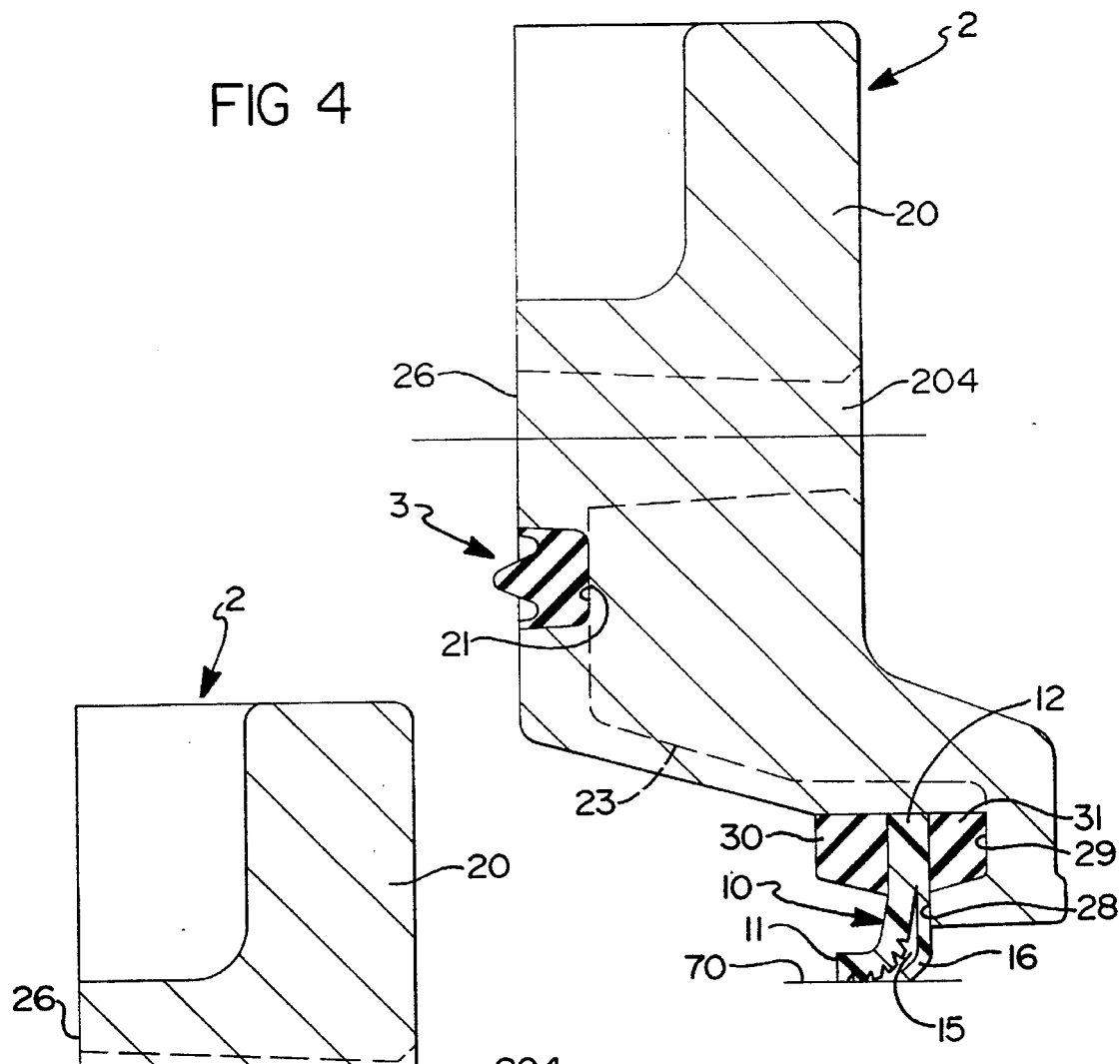
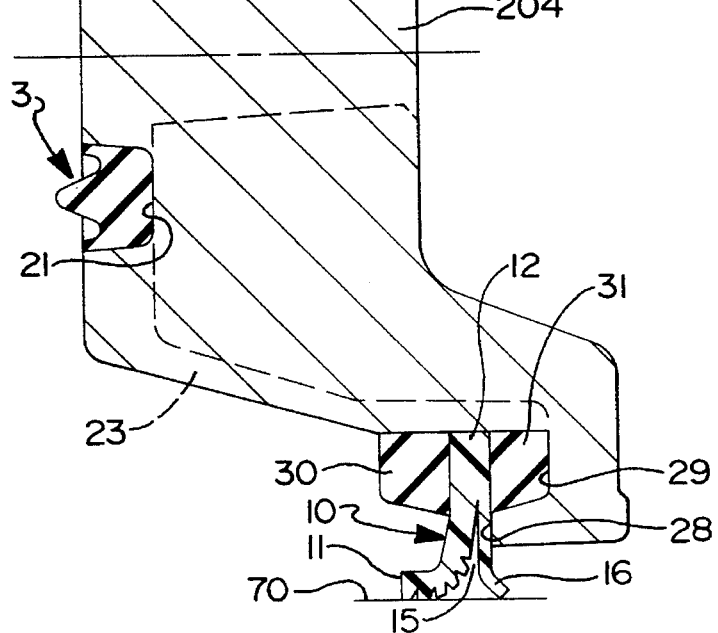

5,462,287

METHOD FOR THE MANUFACTURE OF A SHAFT SEAL

BACKGROUND OF THE INVENTION

1. Field of the Invention

The invention relates to a method for the manufacture of a shaft seal assembly which includes an elastomeric static gasket and a plastic shaft seal lip each bonded to a casting with the elastomeric gasket material securing the plastic seal lip to the casting. The seal assembly is particularly adapted for use in sealing a crankshaft casing.

2. Description of the Prior Developments

In a known seal of this type (EP-A-139,503) firstly the shaft seal ring is shaped onto the radial flange of a cross-sectionally L-shaped sheet metal ring. For connection to a gasket receptacle, the outer, axially parallel portion of the ring is inserted in the cavity of an injection mould, so that in the case of the finished seal the outer portion of the sheet metal ring is received in a recess, in the form of an inner groove, of the gasket receptacle in the form of a plastic moulding the ring is fastened to the receptacle on both sides by elastomer material, which is also used for the static gasket and is linked therewith. The thus formed gasket module comprising the gasket receptacle with the shaft seal ring and the static gasket leads to a prefabricated, interchangeable unit. The described fastening by the axially parallel portion of the L-shaped sheet metal ring requires the shaping of the plastic gasket receptacle on the sheet metal ring, either before or after shaping the shaft seal ring on the inner portion of the sheet metal ring. The elastomer material injected on either side of the axially parallel portion ensures an elastic fastening. As a result of this design type the necessary limited radial tolerances for obtaining the coaxial nature of the sealing lip to the shaft are not always respected. Problems are also caused by the settling or creep of the plastic moulding under screw force, which can lead to leaks between the crankcase and the seal.

For the main use of the invention of the driven side crankshaft seal in motor vehicles, in which the crankshaft, the end wall of the crankcase and the crankcase wall perpendicular thereto are to be sealed with respect to the oil pan or sump, a seal with a light metal pressure die casting as the gasket receptacle has proven completely satisfactory. For the assembly of such a seal all the parts, namely the radial shaft seal ring, the pressure die casting, a flat gasket serving as a static gasket over the end wall of the crankcase, etc. are individually made available, which requires numerous working steps during assembly. This multipart solution leads to many error possibilities and in particular the possibility of damaging the individual components of the shaft seal. In this connection tests carried out by the applicant have revealed that shaft seals often have to be disposed of as waste due to damage in the sealing edge area of the shaft seal ring.

SUMMARY OF THE INVENTION

The object of the invention is to provide a method for the manufacture of a seal, in which the dynamic shaft seal ring and also the static gasket housed in a gasket receptacle are made available in the form of a prefabricated unit. Use is largely made of proven components and in particular the light metal pressure die casting for the reception of the gaskets. The aim is to render reusable the relatively expensive pressure die castings even in the case of a fault, particularly with respect to the shaft seal ring. Identical pressure die castings are to be rendered usable for different gasket modules for initial installation and for use as spares in after-sales service. In addition, the shaft seal ring must be designed in such a way that it not only resists chemical attacks by the medium to be sealed (lubricating oil), but also in the case of high thermal stressing avoids deposits on the sealing lip from the medium.

In a known concept, in which a shaft seal ring and a static gasket are shaped onto a gasket receptacle for forming a shaft seal with a single moulding tool (DE-C 3,634,735), in which the gasket receptacle is drawn from a metal sheet, the following difficulties are encountered which are prejudicial to prefabrication.

As the pressure die castings are not machined and are manufactured with the relatively large tolerances of the pressure die casting process, the moulding tool must be designed in such a way that there is a plastic deformation of the die casting carrier on the impression edges. In a second production attempt in the same moulding tool, the latter no longer brings about a satisfactory impression on the recovered carrier and overfilling takes place.

The requirement of shaping onto the die casting carrier the dynamic and the static gasket in the same moulding tool, makes such tools very expensive to manufacture and maintain, because the very much higher requirements made on the quality of the dynamic gasket, i.e. the shaft seal ring, define the costs.

The volume of the metal parts to be inserted in the tools has a disadvantageous influence on the manufacturing conditions and in particular on the time up to uniform heating to the moulding tool temperature.

In the known concept the higher technical requirements regarding the manufacture of the dynamic sealing edge determine the requirements on the die casting machine and the cycle time. Thus, the much more easily manufactured static gasket is necessarily produced with excessive expenditure.

The manufacture of the gasket according to the known concept requires high capital expenditure with respect to new and large die casting machines with a maximum precision high closing force, which must be suitable for the manufacture of radial shaft seal rings, whereas existing smaller die casting machines must be shut down for such radial shaft seal rings, because these products are substituted by the new gaskets.

The operating conditions generally make it necessary to use for the dynamic gasket a much more expensive material than for the static gasket. Particularly in the case of large gasket modules clear cost advantages would result from using different materials for the static and dynamic gaskets. However, this is unachievable with the known concept.

The invention obviates these difficulties with a method and a seal according to the present invention.

Shaft seal rings made from polytetrafluoroethylene (PTFE) and having a sealing lip and a protective lip, together with a thread-like slot in the sealing lip in order to obtain a return action on the medium to be sealed are known per se (DE-A-3,327,229).

A shaft seal ring with a PTFE sealing lip, unlike in the case of such a ring with an elastomeric sealing lip, always requires an additional hydrodynamic sealing aid, which is generally in the form of a cut or stamped in thread. An example thereof is disclosed by DE-OS 2,460,185.

Detailed research has shown that the failure of such shaft seal rings is mainly due to the fact that the return thread becomes clogged by deposits of decomposition products from the oil to be sealed and consequently stop functioning. These are products from chemical reactions of the oil present in minute quantities in the sealing gap or its additives, as a function of the pressure and temperature prevailing in the sealing gap, as well as the time spent by the oil in the gap.

The invention leads to the following advantages:

the relatively expensive pressure die casting is now processed with completely satisfactory dynamic sealing elements, which reduces the wastage;

for moulding the static gasket on the casting it is possible to use relatively simply designed moulding tools, as well as existing die casting machines;

it is easily possible to use a high-grade, oil-compatible plastic, referably PTFE, for manufacturing the shaft seal ring on the one hand and an inexpensive elastomeric plastic for producing the static gasket on the other;

as a result of the inventive use of a multi-start thread as a hydrodynamic sealing aid, it is possible to increase the oil exchange under the sealing edge in accordance with the number of starts of the thread and consequently to significantly reduce the residence time of the same oil volume under the conditions giving rise to decomposition;

as a result of a radial displacement or an internally non-circular construction, e.g. in the form of an ellipse or multiple polygon, of the PTFE sealing ring the axial edge of the sealing lip in the fitted state passes in wavy manner to a circumferential line of the shaft and therefore exerts an additional return feed action on the medium to be sealed during shaft rotation, which further speeds up the oil exchange under the sealing lip.

As a result of the radial displacement of the sealing lip with respect to the shaft axis, it is also ensured that the shaft surface covered by the lip during shaft rotation is larger than the actual sealing lip bearing surface. The conditions for removing the frictional heat over the shaft are consequently improved and the excess temperature level below the sealing lip is reduced.

BRIEF DESCRIPTION OF THE DRAWINGS

The invention is described in greater detail hereinafter relative to non-limitative embodiments and the attached drawings, wherein:

FIG. 1 is an exploded view of a shaft seal for the output end of a crankshaft of a motor vehicle and the end wall of the associated crankshaft casing.

FIGS. 2 to 5 are on a larger scale, partial cross-sections through different constructions of shaft seals according to the invention.

DETAILED DESCRIPTION OF THE PREFERRED EMBODIMENTS

In the exploded view of FIG. 1 it is possible to see the construction of a seal for the output end of a motor vehicle crankshaft. The seal 2 has as the gasket receptacle an aluminium pressure die casting 20 with a dynamic sealing element 10 preassembled therein, a passage opening 19 for the crankshaft 7, through holes 22 for the screws for fixing to the end wall 62 of a crankcase 6, fitting holes 24 for receiving fitting pins 61, a casing side 26, which cannot be seen in FIG. 1, and an underside 27 at right angles thereto and with which the gasket receptacle is pressed against the oil pan or sump seal 5 of an oil pan or sump 8 fitted to the underside of the crankcase 6.

The axial partial sections of the completely assembled seal 2 shown in FIGS. 2 to 5 represent on a larger scale the construction of different seals according to the invention, identical or identically acting parts being given the same reference numerals.

The dynamic sealing element 10 is made from polytetrafluoroethylene (PTFE). For manufacturing purposes a disk is penetrated by a PTFE tube and is vulcanized flat, i.e. without additional deformation, onto the pressure die casting 20 in the following way. The sealing element 10 in an axial recess 201 of the die casting 20 is pressed against a collar 28 under radial and axial pressure. Above the collar 28 an undercut groove 29 is made in the pressure die casting during the die casting process. On the casing side 26 the die casting 20 has a groove 21 for receiving the static gasket 3 and a connecting channel 23 from said groove 21 to the undercut groove 29 on the back of the shaft seal ring 10, as well as to the area of the recess 201 on the front of said ring 10. It is also possible for several such connecting channels 23 to emanate from the circular groove 21 surrounding the recess 201.

In a moulding stage simultaneously a static gasket 3 filling the circular groove and elastomer material rings 30,31 are moulded, which border the outer portion 12 of the shaft seal ring in the finished state of the seal 2 and are vulcanized to the casting 20.

In order to achieve a completely tight seal in the described moulding process, a nose 203 is provided on the side with the runner or sprue 204 for the elastomer material. On closing the moulding tool, said nose 203 is deformed into the plastic area, the force for pressing initially rising in proportion to the deformation, but then remaining virtually constant on reaching the plastic deformation.

Following the moulding of the static gasket 3 and the rings 30,31, the inner portion 11, which following the penetration by a PTFE tube was provided with slots 110 in the form of a multi-start thread, is still radially positioned. In a following operation the shaft seal ring is drawn onto a cylindrical sleeve with a smaller or identical diameter to the shaft 7 and is consequently axially bent. Shortly prior to the final assembly of the seal on the engine or on the crankshaft 7, the sleeve is removed again.

The only difference in the case of the seal according to FIG. 3 is that it is drawn onto a wearing sleeve 71, which carries an anti-rotation face 72 and during the final assembly is pressed onto the not shown shaft 7. By means of an elastomer support 73 vulcanized internally onto the sleeve 71, a permanent and reliable static seal against creeping oil is obtained, which could otherwise flow between the shaft 7 and the wearing sleeve 71. Providing the elastomer support 73 with a groove pattern reduces the pressing force without any sealing quality loss. This construction has the advantage that there is no need for the sleeve, which would otherwise be temporarily necessary up to the final assembly on the shaft 7. The antirotation face 72, which during operation rotates with the shaft relative to the sealing lip 11 of the shaft seal ring 10, also makes it possible to bring about an optimum matching of the material and surface to the PTFE ring 10. There are also advantages when replacing same in the case of repairs, because the new shaft gasket can be fitted together with a new antirotation face on the shaft.

The constructions according to FIGS. 4 and 5 are similar to that of FIG. 2 with the difference that the shaft seal ring is provided with a radial gap 15 for forming a protective lip 16 before drawing onto a temporary sleeve 70 or onto the integrated sleeve 71 with the antirotation face 72. Otherwise the construction and action are the same as in the embodiments already described relative to FIGS. 2 and 3.

In the embodiment according to FIG. 4 the protective lip 16 is bent in the same direction as the sealing lip 11, whereas in the embodiment according to FIG. 5 it is bent in opposition to said sealing lip.

In all the embodiments the recess receiving the shaft seal ring 10 can be constructed as an eccentric bore 201 with an eccentricity of approximately 0.2 to 1.0 mm. Thus, the edge of the sealing lip 11 of the shaft seal ring 10 is not perpendicular to the shaft rotation axis and is instead sinusoidal.

We claim:

1. A seal assembly for sealing the end of a shaft extending through an end wall of a casing, as well as for sealing the casing end wall, the assembly comprising:

a gasket receptacle having a casing side, a groove formed in said casing side, a passage opening for a shaft, an annular recess located around the passage opening, a collar located adjacent the recess, and a connecting channel extending from the collar along the recess to the groove;

an annular plastic sealing disk having an inner radial portion located in the passage opening and having an outer radial portion secured to the receptacle;

an elastomeric static gasket located in the groove on the casing side for sealing the end wall of the casing;

the plastic sealing disk being mounted within the recess to the gasket receptacle by elastomer material defining a pair of elastomer rings;

the plastic sealing disk being pressed from the casing side under radial and axial pressure in the recess and against the collar; and the sealing rings being connected by the elastomer which extends axially over the plastic sealing disk via the connecting channel and into the groove on the casing side and thereby linking with and forming the static gasket, the rings being axially spaced and located on opposite side portions of the plastic sealing disk.

2. The seal according to claim 1, characterized in that one of the elastomer rings is received on the side of the sealing element disk remote from the casing in a circular groove under-cutting the collar.

3. The seal according to claim 1, characterized in that the sealing element disk is made from polytetrafluoroethylene and engages the shaft by means of a sealing lip bent in the axial direction.

4. The seal according to claim 3, characterized in that the sealing lip is provided with slots in the form of threads for forming a return feed action for the medium to be sealed.

5. The seal according to claim 3, characterized in that the shaft seal ring is radially split for forming a protective lip.

6. The seal according to claim 5, characterized in that the protective lip is bent away from the sealing lip.

7. The seal according to claim 5, characterized in that the protective lip is bent towards the sealing lip.

8. The seal according to claim 7, characterized in that the recess is constructed as an eccentric bore.

9. The seal according to claim 8, characterized in that the seal has an integrated antirotation face for rotating with the shaft.

* * * * *